US009182976B2

(12) United States Patent
Hodges et al.

(10) Patent No.: US 9,182,976 B2
(45) Date of Patent: Nov. 10, 2015

(54) SYSTEM AND METHOD FOR MANAGING CLIENT APPLICATION ENABLEMENT

(71) Applicant: WaveMarket, Inc., Emeryville, CA (US)

(72) Inventors: Daniel Hodges, San Francisco, CA (US); Tasos Roumeliotis, Orinda, CA (US); Jesse Myers, San Francisco, CA (US); Mitchell Scott Ozer, San Francisco, CA (US); Joseph Anakata, Alameda, CA (US)

(73) Assignee: Location Labs, Inc., Emeryville, CA (US)

( * ) Notice: Subject to any disclaimer, the term of this patent is extended or adjusted under 35 U.S.C. 154(b) by 294 days.

(21) Appl. No.: 13/678,400

(22) Filed: Nov. 15, 2012

(65) Prior Publication Data

US 2014/0136651 A1 May 15, 2014

(51) Int. Cl.
*G06F 9/445* (2006.01)
*H04M 1/725* (2006.01)
(Continued)

(52) U.S. Cl.
CPC ........... *G06F 8/665* (2013.01); *H04M 1/72525* (2013.01); *G06F 11/3055* (2013.01); *H04L 41/08* (2013.01)

(58) Field of Classification Search
CPC ............... H04L 9/00; H04L 9/32; H04L 7/00; H04L 7/0004; H04L 29/00; H04L 29/02; H04L 41/00; H04L 41/0246; H04L 41/026; H04L 41/0266; H04L 41/08; H04L 41/0803; H04L 41/0806; H04L 41/0866; H04L 41/0883; H04L 41/0886; H04L 41/5058; H04L 51/02; H04L 51/06; H04L 51/08; H04N 7/18; H04M 1/66; H04M 3/00; H04M 4/12; H04M 1/72525; H04Q 7/20; G06F 3/00; G06F 9/445; G06F 9/54; G06F 15/00; G06F 15/17; G06F 15/177; G06F 17/00; G06F 17/30; G06F 3/048; G06F 9/00; G06F 13/00; G06F 8/665; G06F 11/00; G06F 11/008; G06F 11/30; G06F 11/3003; G06F 11/3051; G06F 11/3055; G06F 11/3065; G06F 13/10; G06F 13/14; G06F 15/16; G06Q 30/00
USPC ................ 709/206, 217, 218, 223, 201–203; 719/313, 318; 705/26.7; 725/76; 713/168
See application file for complete search history.

(56) References Cited

U.S. PATENT DOCUMENTS 6,381,465 B1 * 4/2002 Chern et al. .................. 455/466
6,397,381 B1 * 5/2002 Delo et al. .................... 717/174

(Continued)

OTHER PUBLICATIONS

And you think 160 is not enough? Oct. 2010, vedovini.net.*

*Primary Examiner* — Brian J Gillis
*Assistant Examiner* — Boris Grijalva Lobos
(74) *Attorney, Agent, or Firm* — Dovas Law, P.C.

(57) ABSTRACT

A method for implementation by a network-connectable computing system is provided. The method includes receiving an indication of a service corresponding to a mobile device, the indication based on a user action, and transmitting at least one message to the mobile device responsive to the indication of the service. The at least one message includes an instruction for a particular application corresponding to the service to provide a status of the particular application and an instruction for a user of the mobile device to initiate contact with a network resource to access data corresponding to the particular application. Further provided is a system for managing client application enablement and operation.

25 Claims, 4 Drawing Sheets

(51) Int. Cl.
*G06F 11/30* (2006.01)
*H04L 12/24* (2006.01)

(56) References Cited

U.S. PATENT DOCUMENTS

| | | | |
|---|---|---|---|
| 6,496,979 B1* | 12/2002 | Chen et al. | 717/178 |
| 7,991,388 B1* | 8/2011 | Becker et al. | 455/411 |
| 8,131,281 B1* | 3/2012 | Hildner et al. | 455/418 |
| 8,145,245 B2* | 3/2012 | Aula | 455/466 |
| 8,169,916 B1* | 5/2012 | Pai et al. | 370/238 |
| 8,527,814 B1* | 9/2013 | Elwell et al. | 714/38.1 |
| 2002/0152470 A1* | 10/2002 | Hammond | 725/76 |
| 2004/0221101 A1* | 11/2004 | Voorhees et al. | 711/111 |
| 2005/0057773 A1* | 3/2005 | Buck et al. | 358/1.15 |
| 2005/0102665 A1* | 5/2005 | Barta et al. | 717/174 |
| 2007/0169107 A1* | 7/2007 | Huttunen | 717/174 |
| 2008/0109823 A1* | 5/2008 | Whitfield et al. | 719/318 |
| 2008/0256087 A1* | 10/2008 | Piironen et al. | 707/10 |
| 2008/0272935 A1* | 11/2008 | Peters et al. | 340/870.16 |
| 2009/0177484 A1* | 7/2009 | Davis et al. | 705/1 |
| 2010/0049975 A1* | 2/2010 | Parno et al. | 713/168 |
| 2010/0146500 A1* | 6/2010 | Joubert et al. | 717/178 |
| 2010/0161506 A1* | 6/2010 | Bosenick et al. | 705/347 |
| 2010/0273450 A1* | 10/2010 | Papineau et al. | 455/411 |
| 2011/0028187 A1* | 2/2011 | Kelkka et al. | 455/567 |
| 2011/0225293 A1* | 9/2011 | Rathod | 709/224 |
| 2012/0142268 A1* | 6/2012 | Tao et al. | 455/3.05 |
| 2013/0017884 A1* | 1/2013 | Price et al. | 463/25 |
| 2013/0030954 A1* | 1/2013 | Liu et al. | 705/26.7 |
| 2013/0179833 A1* | 7/2013 | Stallings et al. | 715/810 |
| 2014/0068631 A1* | 3/2014 | Lenahan et al. | 719/313 |
| 2014/0108563 A1* | 4/2014 | Hung et al. | 709/206 |

* cited by examiner

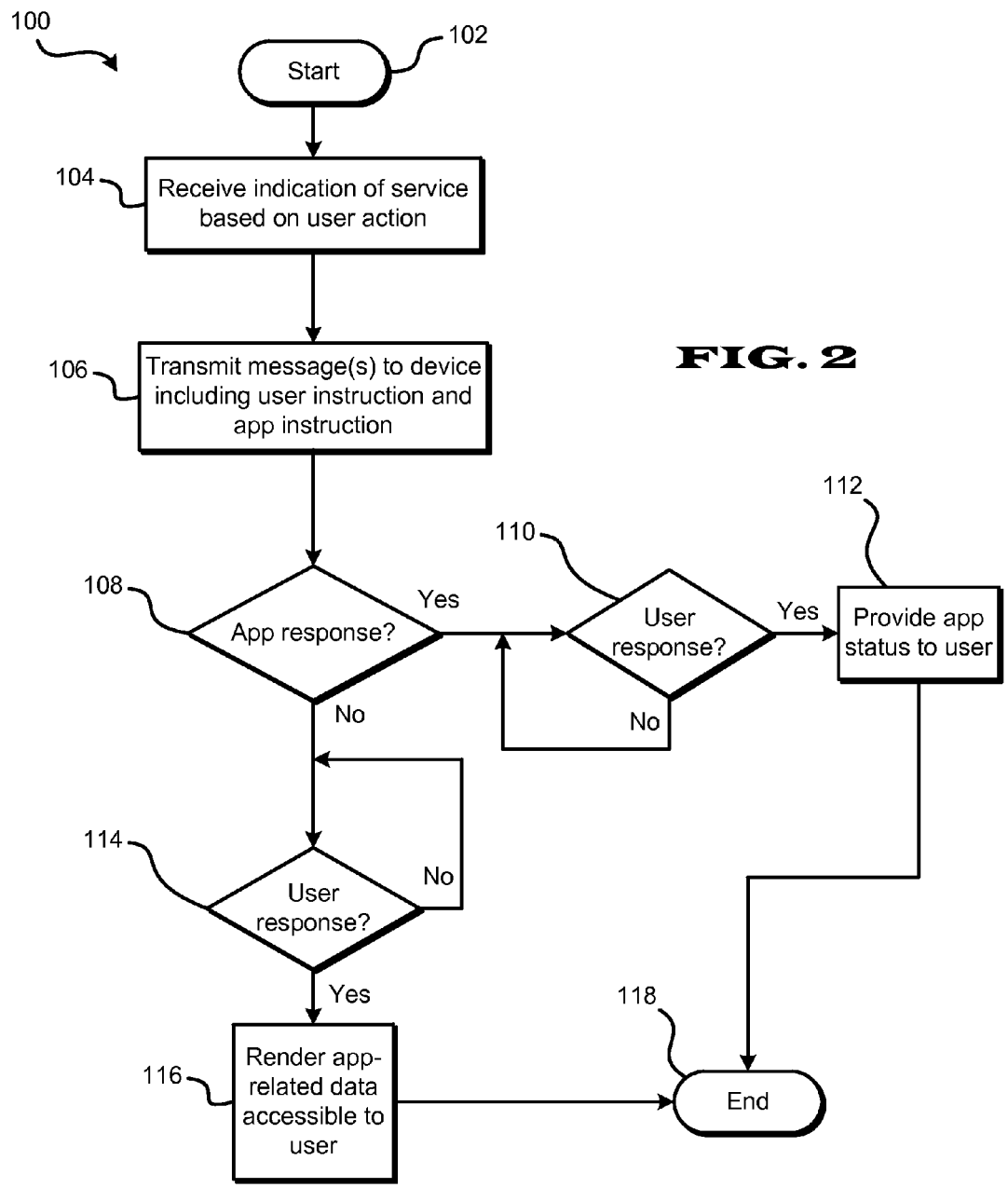

SYSTEM AND METHOD FOR MANAGING CLIENT APPLICATION ENABLEMENT

BACKGROUND

To enable application functionality, a server-based application may require an associated client application to be installed on a local device, for example a mobile communication device such as a smartphone or other wireless communication device. A particular server-based application may be exceptionally useful to proper device functionality and therefore the associated client application may be pre-installed on the device by a manufacturer, distributer, telecommunication carrier or other party responsible for distribution of the device. If the client application is pre-installed, privacy concerns may dictate that the client application is forbidden from contacting the server enabling the associated server-based application. If the client application is not preinstalled on the device, then the device user must locate and install the client application, for example by connecting to a network resource enabling download of the client application. Depending on the user's skill and comfort with the device, the process of downloading the client application may be inconvenient and time consuming.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method for implementation by a network-connectable computing system is provided. The method includes receiving an indication of a service corresponding to a mobile device, the indication based on a user action, and transmitting at least one message to the mobile device responsive to the indication of the service. The at least one message includes an instruction for a particular application corresponding to the service to provide a status of the particular application and an instruction for a user of the mobile device to initiate contact with a network resource to access data corresponding to the particular application.

Further provided is a method performed by a plurality of network-connectable computing systems. The method includes receiving with a first network-connectable computing system an indication based on a user action of a service corresponding to a second network-connectable computing system. Responsive to the indication of the service, at least one message is transmitted with the first computing system. The at least one message includes an instruction for a particular application to provide a status of the particular application and an instruction for a user to initiate contact with a network resource to access data corresponding to the particular application. With the second computing system, the at least one message is received from the first computing system. Responsive to the at least one message, the status of the particular application is provided using the particular application via the second computing system, and the status of the particular application is received with the first computing system from the second computing system.

Further provided is a computing system comprising at least one non-transitory computer readable storage medium having encoded thereon instructions that, when executed by one or more processors of the system, cause the system to perform a process including receiving an indication of a service corresponding to a mobile device, the indication based on a user action, and transmitting at least one message to the mobile device responsive to the indication of the service. The at least one message includes an instruction for a particular application corresponding to the service to provide a status of the particular application and an instruction for a user of the mobile device to initiate contact with a network resource to access data corresponding to the particular application.

Further provided is a network-enabled communication system. The system includes a first network-connectable computing system configured for receiving an indication of a service corresponding to a mobile device, the indication based on a user action, and transmitting at least one message to the mobile device. The at least one message includes an instruction for a particular application corresponding to the service to provide a status of the particular application and an instruction for a user of the mobile device to initiate contact with a network resource to access data corresponding to the particular application. The system further includes a second network-connectable computing system configured for executing the particular application, the particular applciation operable to enable a process including accessing the at least one message and responsive to the at least one message, providing the status of the particular application.

BRIEF DESCRIPTION OF THE DRAWING(S)

A more detailed understanding may be had from the following description, given by way of example with the accompanying drawings. The figures in the drawings and the detailed description are examples. The figures and the detailed description are not to be considered limiting and other examples are possible. Like reference numerals in the figures indicate like elements wherein:

FIG. 2 is a diagram showing a method for managing client application enablement.

DETAILED DESCRIPTION OF ILLUSTRATIVE EMBODIMENT(S)

It would be beneficial for a computing device user who requires a particular client application to be installed on the user's device, for example to enable a particular network-accessible application, to receive instructions for doing so and to obtain the required application for example via a network resource. Whereas should the particular client application already exist on the user's device, it would be beneficial for the user could forgo one or more steps in the process of obtaining the client application. Such client application may include for example a location based service application required to enable a locator service operated by one or more network-accessible servers. Alternatively, a client application can provide other suitable functionality autonomously or in conjunction with a network accessible server-based application. Since a client application which is installed on a device may lack authorization to initiate contact with an appropriate network resource to activate the application or to provide application status, a process is required to efficiently enable the application on the device.

Figure 1:
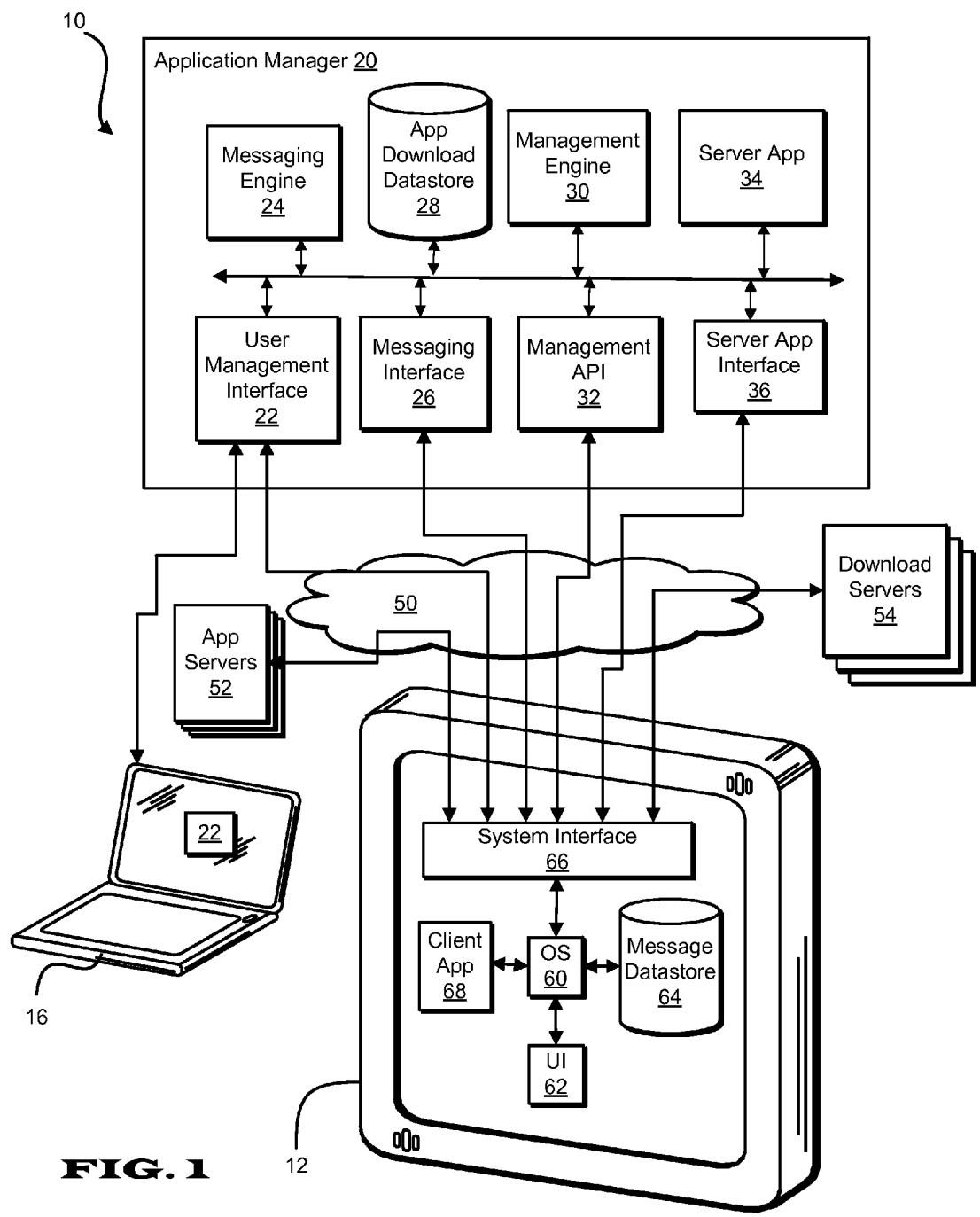
FIG. 1 shows a system for managing client application enablement and operation.

Referring to FIG. 1, a system 10 is provided including an application manager 20 used for managing enablement and operation of a client application on a user's network-connectable computing system. The application manager 20 enables a user management interface 22, a messaging engine 24, a messaging interface 26, an application download datastore 28, a management engine 30, a management application program interface ("API") 32, a server application 34, and a server application interface 36. The application manager 20 can be implemented on one or more network-connectable computing systems and need not be implemented on a single system at a single location. The application manager 20 is configured for communication via the network 50 with other network-connectable computing systems, for example the wireless mobile communication device ("mobile device") 12.

The mobile device 12 can include for example a smartphone or other wireless mobile terminal preferably configured to operate on a wireless telecommunication network. Software and/or hardware residing on the mobile device 12 enable an operating system 60, a user interface 62, a message datastore 64, and a system interface 66. The operation of the application manager 20 is described herein with respect to the mobile communication device 12 and client device 16. One skilled in the art will recognize the operation of the application manager 20 can operate with other suitable wired or wireless network connectable devices.

The user management interface 22 can include a web application or other application enabled by the application manager 20 and accessible to the monitored mobile communication device 12 or other client device 16 via a network 50 and/or executed by the mobile communication device 12 or other client device 16. The application manager 20 can further enable a server application 34 configured for operation with a client application on a network connectable computing system such as the mobile device 12. The server application 34 is accessible via an application program interface labeled as the server application interface 36. The server application 34 can for example enable a service such as a locator service configured to provide the location of persons known to the user of the mobile device 12.

Referring to FIG. 2, a method 100 for enabling a client application is shown. The method 100 is described with reference to the components shown in the system 10 of FIG. 1, including the application manager 20 which is preferably configured for performing the method 100 and includes or has access to suitable non-transitory data storage including instructions for performing the method. The method 100 may alternatively be performed via other suitable computing system or systems in other suitable environments.

The method 100 starts at step 102. In a step 104, the application manager 20 receives an indication of a service corresponding to a particular mobile device 12 based on a user action. The indication of a service can include an indication that a service has been initiated or an account created by a user action. The service can be enabled for example by the server application 34 via the server application interface 36, and the user management interface 22 can enable a user to create (i.e. register) an account or otherwise initiate a service via the mobile device 12, client device 16 or other network-connectable computing system. For example, a user of the mobile device 12 can register for the service (e.g. a locator service) via the user management interface 22. Alternatively, the service can be enabled by one or more other application servers 52.

In a step 106 the application manager 20 transmits one or more messages, for example via the messaging interface 26, to a network-connectable computing system such as the mobile device 12 responsive to the indication of the service. The method 100 is described with reference to the mobile device 12, although any suitable network-connectable computing system can be used. A message can include a short message service protocol ("SMS") message or any suitable message type. The one or more messages include an instruction for a particular application 68 corresponding to the service to provide a status of the particular application 68. The status can include an indication that the particular client application 68 is present on the mobile device. The one or more messages further include an instruction for a user of the mobile device 12 to initiate contact with a network resource, for example the application manager 20 or a download server 54, to access data corresponding to the particular application 68. The data corresponding to the particular application 68 can include for example data useful for installing or updating the particular application 68 on the mobile device 12.

Figure 3A:
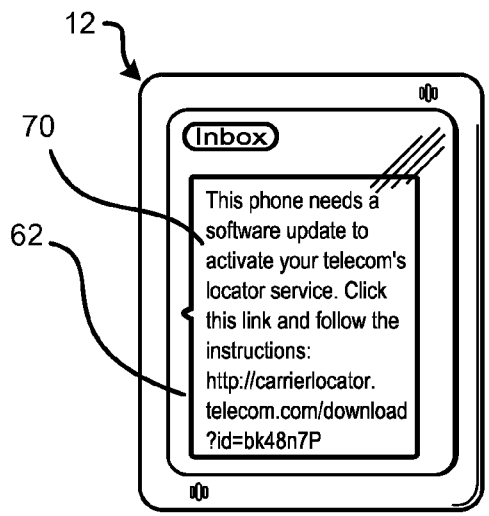
FIGS. 3A-3D show example screen displays enabled on a device operating within the environment of FIG. 1.

A message can include a text message, for example a human readable short message service protocol ("SMS") message, which provides instructions for how to obtain the client application 68, such as via a download link. Referring to FIG. 3A, an example text message 70 is shown, as enabled by the user interface 62 of the mobile device 12 which reads: "This phone needs a software update to activate your telecom's locator service. Click this link and follow the instructions: http://carrierlocator.telecom.com/download?id=bk48n7P". The text message can include an agreed upon token, pattern, or other encoded signal that is detectable by the client application if the client application present on the mobile device 12. The signal can be for example a unique code added to the end of a download link in the message. For example, the text "bk48n7" can be interpreted by a particular client application 68 installed on the mobile device 12 as the instruction for the application 68 to provide its status. In such case, a single message provides instructions for both the user and the client application. If the client application 68 is present on the mobile device, the client application 68 detects the incoming text message and interprets its arrival as an indication that it is permissible to contact the application manager 20 via the network 50 and initiate a process of informing the application manger 20 that the client application 68 is installed on the mobile device 12. Of course if the client application 68 is not installed on the mobile device 12, there can be no response from the client application 68.

Figure 3B:
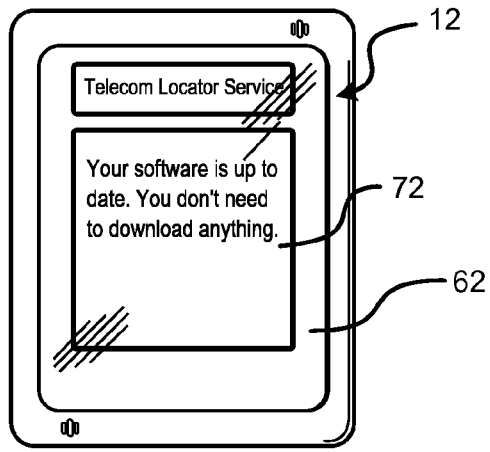

Referring to the method 100, if in step 108 the application manager 20 receives a response to the application instruction from the client application 68 indicating its status, for example indicating via the management API 32 that the application 68 is present on the mobile device 12 and/or the application 68 is up to date on the mobile device 12, the process moves to step 110 where it is determined whether a user response has been received. The user response can include a request for application data of the application based on the instruction for the user to access data corresponding to the particular application. The user response is preferably enabled by the mobile device 12 as a transmission from the mobile device 12. If in the step 110 it is determined that a user response has been received by the application manager 20 to the user instruction, an indication of the status of the application 68 is provided to the user (step 112). The indication of the status of the particular application can indicate that the particular application is installed on the mobile device. For example, referring to FIG. 3B an example message 72 enabled responsive to a user following a link of the type in the message 70 of FIG. 3A is shown. The message 72 can be enabled by the user management interface 22 and displayed via the user interface 62 of the mobile device 12. The message 72 reads "Your software is up to date. You don't need to download anything."

If in the step 108 it is determined by the application manager 20 that no response is received from the client application 68 or that the response from the application 68 indicates the client application 68 requires update, the process moves to step 114. If in step 114 it is determined that a user response has been received by the application manager 20, data enabling installation or update of the client application 68 is rendered accessible for download by the user of the mobile device (step 116), for example via the user management interface 22 or download server 54. The user response can include a request for application data of the application based on the instruction for the user to access data corresponding to the particular application. In rendering the data enabling install or update of the client application 68 accessible, application-related data can be transmitted via the network 50. Accordingly, the user of the mobile device 12 can initiate download and installation of the client application 68 on the mobile device 12. Thereafter, referring to FIG. 3C the application manager 20 or client application 68 can enable a message via the user interface 62, for example the message 74 which reads: "Congratulations, you have completed the setup process." The method ends at step 118.

Figure 3C:
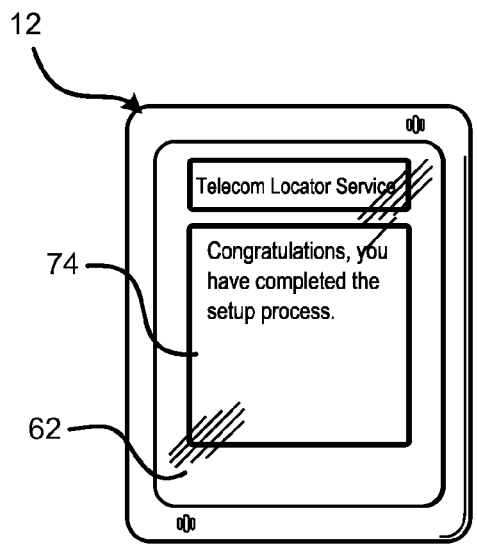
Figure 3D:
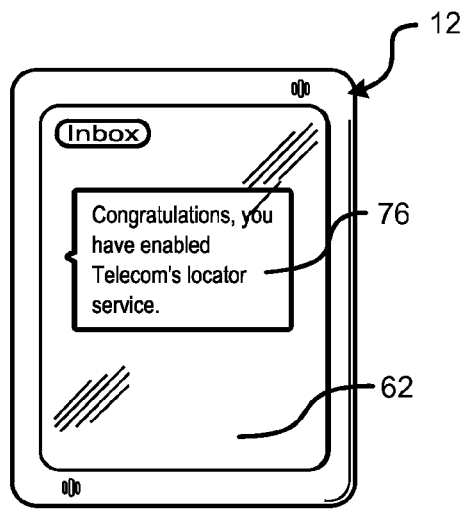

In an alternative implementation, step 110 can be omitted and the application manager 20 can provide the application status to the mobile device 12 responsive to receiving a response from the client application 68 indicating the status of the client application 68. For example, upon detecting the message instructions, the installed client application 68 can delete the one or more messages including the instructions from an inbox of the mobile device 12 using one or more APIs provided on the mobile device 12, which may result in permanent deletion of the message(s) or moving of the message to another datastore on the mobile device 12. The client application 68 can further contact the application manager 20 to provide the status of the client application 68, and the application manager 20 via the messaging interface 26 then sends a message, for example as shown in FIG. 3D, which message 76 reads "Congratulations, you have enabled Telecom's locator service." In another example, upon detecting the message instructions, the installed client application 68 can replace or modify the contents of the original message(s) stored on the mobile device 12 to provide an updated link to a network location enabled by the application manager to include congratulations copy, for example as shown in FIGS. 3C and 3D.

In another alternative implementation, steps 110 and 112 can be omitted and the process as performed by the application manager 20 ends (step 118) upon receipt of a response from the client application 68. For example, upon detecting the message instructions, the installed client application 68 can modify the contents of the original message(s) stored on the mobile device 12 to include congratulations copy such as shown in FIGS. 3C and 3D, or provide an updated link to a network location which shows such congratulations copy.

In the cases where congratulations copy or other notification is provided by the client application 68 responsive to detecting the message instructions, the client application 68 can for example bring itself to the foreground of the user interface 62, preferably in an application screen. In such case, the client application 68 can delete, modify, or leave unchanged the original message(s) per the implementations described above.

The method 100 and the alternative implementations allow users who do not have the client application 68 already installed on their mobile device to receive a message with instructions on how to obtain data to install the required client application. Users who happen to have the application installed on their device, for example preinstalled by a distributer of the device, are notified that setup is complete and saved the inconvenience of having to download unnecessary and redundant software.

Figure 4:
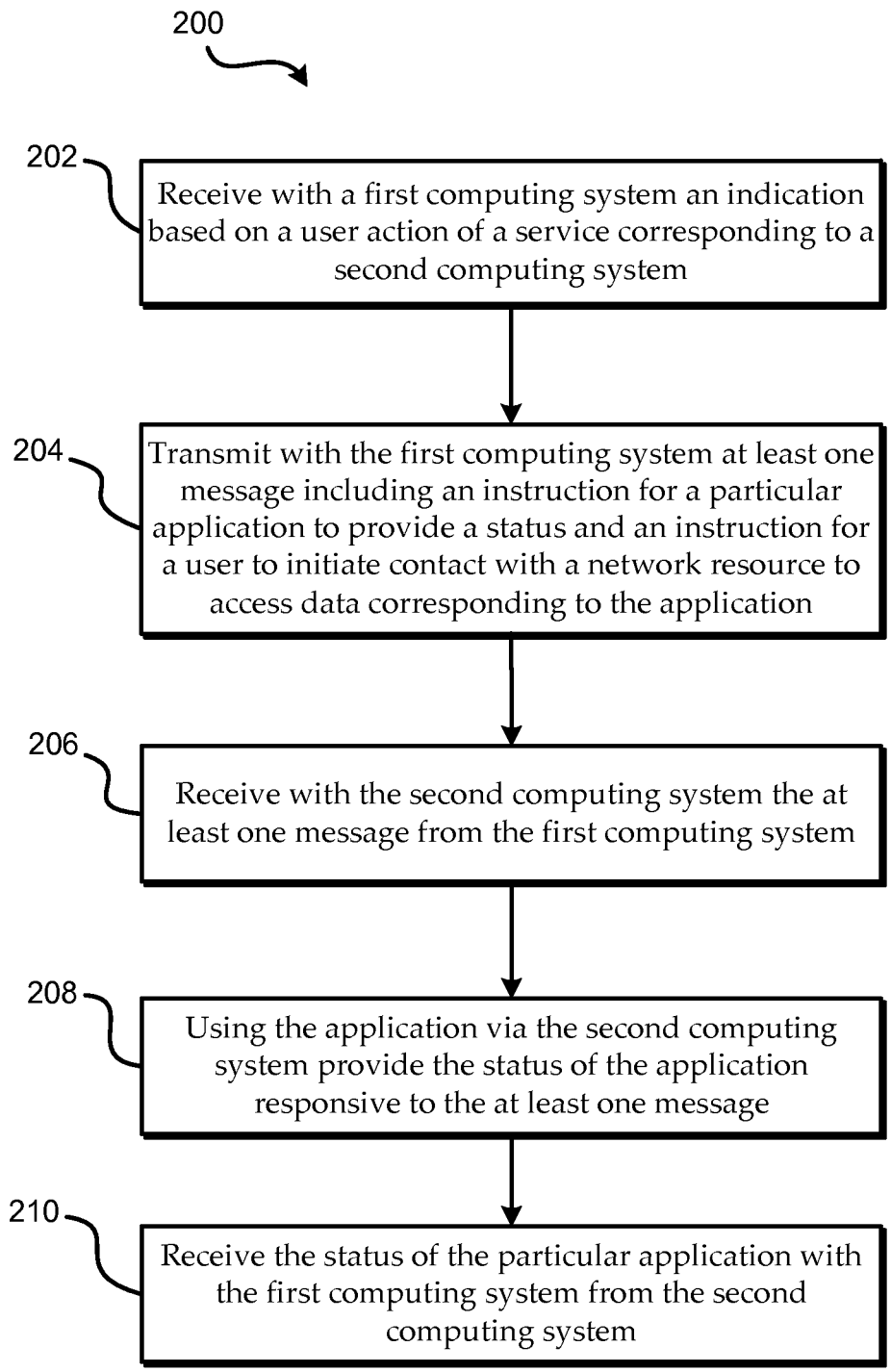
FIG. 4 is a diagram showing a method for managing client application enablement as performed by a first network-connectable computing system and a second network-connectable computing system.

Referring to FIG. 4, a method 200 performed by a plurality of network-connectable computing systems is provided. The method 200 can be performed for example via the mobile device 12 and the application manager 20, which preferably include or have access to suitable non-transitory data storage including instructions for performing the method 200. The method 200 may alternatively be performed via other suitable computing systems in other suitable environments. The method 200 includes receiving with a first network-connectable computing system an indication based on a user action of a service corresponding to a second network-connectable computing system (step 202). Responsive to the indication of the service, at least one message is transmited with the first computing system (step 204). The at least one message includes an instruction for a particular application to provide a status of the particular application and an instruction for a user to initiate contact with a network resource to access data corresponding to the particular application. With the second computing system the at least one message is received from the first computing system (step 206). The status of the particular application is provided responsive to the at least one message using the particular application via the second computing system (step 208), and the status of the particular application is received with the first computing system from the second computing system (step 210).

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method for implementation by a network-connectable computing system, the method comprising:
receiving an indication of a service corresponding to a mobile device, the indication based on a user action; and
transmitting at least one text message to the mobile device responsive to the indication of the service, the at least one text message comprising:
an instruction for a particular application corresponding to the service to provide a status of the particular application; and
an instruction for a user of the mobile device to initiate contact with a network resource to access data corresponding to the particular application;
wherein the instruction for the particular application is a unique code represented by any one of a token, a pattern, or an encoded signal, and is included in the text message as an attachment to the instruction to the user of the mobile device;
determining based on a lack of a response from the particular application that at least one of an update of the particular application and installation of the particular application is required;

determining that a response from the user has been received; and rendering to the mobile device data enabling at least one of an update of the particular application and installation of the particular application responsive to the response from the user and based on the lack of a response from the particular application.

2. The method of claim 1, wherein the at least one text message comprises a short message service (SMS) protocol message.

3. The method of claim 1, wherein the at least one text message comprises an encoded signal detectable by the particular application.

4. The method of claim 1, further comprising receiving from the particular application via the mobile device the status responsive to the instruction to provide the particular application's status.

5. The method of claim 4, wherein the status of the particular application includes an indication that the particular application is installed on the mobile device.

6. The method of claim 1, the method further comprising:
receiving from the user via the mobile device a request for application data corresponding to the particular application based on the instruction for the user to access data corresponding to the particular application;
transmitting the application data to the mobile device via the network.

7. The method of claim 1, further comprising:
receiving from the particular application via the mobile device the status of the particular application based on the instruction to provide the status;
receiving from the user via the mobile device a communication based on the instruction for the user of the mobile device to initiate contact with a network resource; and
providing the user an indication of the status of the particular application responsive to receiving the communication from the user.

8. The method of claim 7, wherein the indication of the status of the particular application indicates that the particular application is installed on the mobile device.

9. The method of claim 1, further comprising enabling a user account registration corresponding to the particular application, wherein the user action comprises the user account registration.

10. The method of claim 1, further comprising
enabling the network resource;
receiving from the user via the mobile device a communication based on the instruction for the user of the mobile device to initiate contact with the network resource; and
at least one of providing the user an indication of the status of the particular application and rendering application data corresponding to the particular application accessible for download.

11. A method comprising:
receiving with a first network-connectable computing system an indication of a service corresponding to a second network-connectable computing system, the indication based on a user action;
responsive to the indication of the service, transmitting with the first computing system at least one text message, the at least one text message comprising:
an instruction for a particular application to provide a status of the particular application; and
an instruction for a user to initiate contact with a network resource to access data corresponding to the particular application;

wherein the instruction for the particular application is a unique code represented by any one of a token, a pattern, or an encoded signal, and is included in the text message as an attachment to the instruction to the user of the mobile device;
receiving with the second computing system the at least one text message from the first computing system;
responsive to the at least one text message, using the particular application via the second computing system to provide the status of the particular application; and
receiving with the first computing system the status of the particular application from the particular application via the second computing system;
determining with the first computing system based on the received status from the particular application that at least one of an update of the particular application and installation of the particular application is required;
determining that a response from the user has been received; and
rendering to the mobile device data enabling at least one of an update of the particular application and installation of the particular application based on the contact from the user and based on the received status from the particular application.

12. The method of claim 11, wherein the second computing system comprises a mobile device.

13. The method of claim 11, wherein the first computing system comprises a plurality of network-connectable systems.

14. The method of claim 11, further comprising:
enabling with the second computing system a user transmission from the user responsive to the instruction to initiate contact with the network resource;
receiving with the first computing device the user transmission;
using the first computing device, providing the user with an indication of the status of the particular application.

15. The method of claim 11, wherein the indication of the status comprises an indication that a setup process associated with the particular application has been completed.

16. The method of claim 11, further comprising using the particular application to at least one of delete, move, hide and modify the at least one text message on the second computing system based on the status of the particular application.

17. The method of claim 16, further comprising using the first computing system to provide the user with an indication of the status of the particular application.

18. The method of claim 11, further comprising using the particular application via the second computing system to at least one of modify and replace the at least one text message to provide the user with an indication of the status of the particular application.

19. The method of claim 11, further comprising using the particular application via the second computing system to at least one of modify and replace the at least one text message to provide the user with a link to a network resource configured to provide an indication of the status of the particular application.

20. The method of claim 11, further comprising using the particular application to provide the user with a link to a network resource configured to provide an indication of the status of the particular application.

21. The method of claim 11, further comprising using the particular application to provide the user with an indication of the status of the particular application.

22. The method of claim 21, further comprising providing the indication of the status of the particular application in a user interface enabled by the particular application.

23. The method of claim 11, wherein the first network-connectable computing system comprises the network resource.

24. A computing system comprising at least one non-transitory computer readable storage medium having encoded thereon instructions that, when executed by one or more processors of the system, cause the system to perform a process including:
- receiving an indication of a service corresponding to a mobile device, the indication based on a user action; and
- transmitting at least one text message to the mobile device, the at least one text message comprising:
  - an instruction for a particular application corresponding to the service to provide a status of the particular application; and
  - an instruction for a user of the mobile device to initiate contact with a network resource to access data corresponding to the particular application;
  - wherein the instruction for the particular application is a unique code represented by any one of a token, a pattern, or an encoded signal, and is included in the text message as an attachment to the instruction to the user of the mobile device;
- determining based on a lack of a response from the particular application that at least one of an update of the particular application and installation of the particular application is required;
- determining that a response from the user has been received; and
- rendering to the mobile device data enabling at least one of an update of the particular application and installation of the particular application based on the response from the user and based on the lack of a response from the particular application.

25. A network-enabled communication system comprising:
- a first network-connectable computing system configured for:
  - receiving an indication of a service corresponding to a mobile device, the indication based on a user action; and
  - transmitting at least one text message to the mobile device, the at least one text message comprising:
    - an instruction for a particular application corresponding to the service to provide a status of the particular application; and
    - an instruction for a user of the mobile device to initiate contact with a network resource to access data corresponding to the particular application;
    - wherein the instruction for the particular application is a unique code represented by any one of a token, a pattern, or an encoded signal, and is included in the text message as an attachment to the instruction to the user of the mobile device; and
- a second network-connectable computing system configured for executing the particular application, the particular application operable to enable a process comprising:
  - using the particular application to access the at least one text message;
  - responsive to the at least one text message, providing the status of the particular application; and
  - using the particular application to at least one of delete, move, hide and modify the at least one text message on the second computing system based on the status of the particular application.

* * * * *

UNITED STATES PATENT AND TRADEMARK OFFICE
CERTIFICATE OF CORRECTION

| | | |
|---|---|---|
| PATENT NO. | : 9,182,976 B2 | Page 1 of 1 |
| APPLICATION NO. | : 13/678400 | |
| DATED | : November 10, 2015 | |
| INVENTOR(S) | : Hodges et al. | |

It is certified that error appears in the above-identified patent and that said Letters Patent is hereby corrected as shown below:

IN THE CLAIMS

At column 8, line 36 claim 14 delete the word "device" and insert therefor --system--.

At column 8, line 37 claim 14 delete the word "device" and insert therefor --system--.

Signed and Sealed this
Third Day of May, 2016

Michelle K. Lee
*Director of the United States Patent and Trademark Office*